United States Patent
Sezginer et al.

(10) Patent No.: US 12,353,970 B2
(45) Date of Patent: Jul. 8, 2025

(54) FINDING SEMICONDUCTOR DEFECTS USING CONVOLUTIONAL CONTEXT ATTRIBUTES

(71) Applicant: KLA Corporation, Milpitas, CA (US)

(72) Inventors: Abdurrahman Sezginer, Monte Sereno, CA (US); Gordon Rouse, Dublin, CA (US); Manikandan Mariyappan, San Jose, CA (US)

(73) Assignee: KLA CORPORATION, Milpitas, CA (US)

( * ) Notice: Subject to any disclaimer, the term of this patent is extended or adjusted under 35 U.S.C. 154(b) by 1085 days.

(21) Appl. No.: 17/098,256

(22) Filed: Nov. 13, 2020

(65) Prior Publication Data

US 2021/0158223 A1 May 27, 2021

Related U.S. Application Data

(60) Provisional application No. 62/939,534, filed on Nov. 22, 2019.

(51) Int. Cl.
*G06N 20/00* (2019.01)
*G01N 21/95* (2006.01)
*G01N 21/956* (2006.01)
*G06N 20/10* (2019.01)

(52) U.S. Cl.
CPC ......... *G06N 20/10* (2019.01); *G01N 21/9501* (2013.01); *G01N 21/95607* (2013.01); *G01N 21/95623* (2013.01); *G01N 2021/95615* (2013.01)

(58) Field of Classification Search
CPC ..................................................... G06N 20/10
See application file for complete search history.

(56) References Cited

U.S. PATENT DOCUMENTS

| 6,408,109 B1* | 6/2002 | Silver | G06T 7/12 382/199 |
|---|---|---|---|
| 8,165,854 B1* | 4/2012 | Wei | G03F 1/36 703/2 |
| 2002/0133801 A1* | 9/2002 | Granik | G03F 1/80 716/52 |
| 2006/0067571 A1 | 3/2006 | Onishi | |
| 2010/0128969 A1* | 5/2010 | Cao | G03F 7/70675 382/144 |

(Continued)

FOREIGN PATENT DOCUMENTS

| CN | 104854677 A | 8/2015 |
|---|---|---|
| EP | 3518041 A1 | 7/2019 |

(Continued)

OTHER PUBLICATIONS

PCT/US2020/060807, International Search Report, Mar. 9, 2021.
(Continued)

*Primary Examiner* — Edward Park
(74) *Attorney, Agent, or Firm* — Huse IP Law

(57) ABSTRACT

Context attributes for optical imaging of a patterned layer of a semiconductor die are calculated. Calculating the context attributes includes calculating convolutions of a pattern of the patterned layer with respective kernels of a plurality of kernels, wherein the plurality of kernels is orthogonal. Defects on the semiconductor die are found in accordance with the context attributes.

26 Claims, 12 Drawing Sheets

(56) References Cited

U.S. PATENT DOCUMENTS

| | | | | |
|---|---|---|---|---|
| 2013/0308860 | A1* | 11/2013 | Mainali | G06V 10/757 |
| | | | | 382/199 |
| 2017/0147734 | A1* | 5/2017 | Rosenbluth | G06F 30/367 |
| 2017/0200264 | A1 | 7/2017 | Park et al. | |
| 2018/0075594 | A1 | 3/2018 | Brauer | |
| 2018/0149967 | A1* | 5/2018 | Lai | G03F 1/36 |
| 2018/0314163 | A1* | 11/2018 | Liu | G03F 7/70441 |
| 2019/0067060 | A1 | 2/2019 | Plihal et al. | |
| 2019/0188840 | A1* | 6/2019 | Kwon | G06V 10/764 |
| 2019/0304851 | A1 | 10/2019 | Smith et al. | |
| 2020/0348244 | A1* | 11/2020 | Kumar | G02F 1/353 |
| 2021/0158223 | A1* | 5/2021 | Sezginer | G01N 21/95607 |

FOREIGN PATENT DOCUMENTS

| | | |
|---|---|---|
| JP | H1187446 A | 3/1999 |
| JP | 2003004427 A | 1/2003 |
| TW | 201218293 A | 5/2012 |
| WO | 2010050488 A1 | 5/2010 |

OTHER PUBLICATIONS

PCT/US2020/060807, Written Opinion of the International Searching Authority, Mar. 9, 2021.
A.K.K. Wong, Optical Imaging in Projection Microlithography, chs. 7-9, pp. 133-189, SPIE Press, 2005.
H. Gamo, "Mathematical analysis of intensity distribution of the optical image in various degrees of coherence of illumination (representation of intensity by Hermitian matrices)," J. Micro/Nanolith. MEMS MOEMS 18(2), 021101 (2019).
TW Intellectual Property Office, "Office Action of the Intellectual Property Office," May 9, 2024 (translation and original).
China National Intellectual Property Adminstration, First Office Action for App. No. 202080077797.9, Jul. 12, 2024.
Lin et al., "Research on Online Detection of Die Surface Defects Based on Machine Vision," Equipment for Electronic Products Manufacturing, Apr. 2018.
Qiao et al., "Research on Workpiece Defect Detection Method Based on CNN," Computer Science vol. 44, No. 11A, Nov. 2017.
China National Intellectual Property Administration, Second Office Action for App. No. 202080077797.9, Jan. 7, 2025.
Korean Intellectual Property Office, Office Action, KR Patent App. No. 10-2022-7020151, Apr. 3, 2025 (translation and original).

* cited by examiner

900 ⟶

```
┌─────────────────────────────────────────────────────────────────────────────┐
│ Calculate context attributes for optical imaging of a patterned layer of a  │
│ semiconductor die: calculate convolutions of a pattern of the patterned     │
│ layer with respective kernels of a plurality of kernels. The plurality of   │
│ kernels is orthogonal. (902)                                                │
├─────────────────────────────────────────────────────────────────────────────┤
│           The plurality of kernels is Hermite Gaussian functions. (904)     │
├─────────────────────────────────────────────────────────────────────────────┤
│           The plurality of kernels is for a Gabor transform. (906)          │
├─────────────────────────────────────────────────────────────────────────────┤
│  The patterned layer is a first patterned layer, the pattern is a first     │
│  pattern, and the plurality of kernels is a first plurality of kernels.     │
│  Calculate cross-terms between convolutions of the first pattern with       │
│  respective kernels of the first plurality of kernels and convolutions of   │
│  a second pattern of a second patterned layer with respective kernels of    │
│  a second plurality of kernels. The second plurality of kernels is          │
│  orthogonal. (908)                                                          │
└─────────────────────────────────────────────────────────────────────────────┘
                                       ↓
┌─────────────────────────────────────────────────────────────────────────────┐
│ Find defects on the semiconductor die in accordance with the context        │
│ attributes. (910)                                                           │
└─────────────────────────────────────────────────────────────────────────────┘
```

FIG. 9

FINDING SEMICONDUCTOR DEFECTS USING CONVOLUTIONAL CONTEXT ATTRIBUTES

RELATED APPLICATION

This application claims priority to U.S. Provisional Patent Application No. 62/939,534, filed on Nov. 22, 2019, which is incorporated by reference in its entirety for all purposes.

TECHNICAL FIELD

This disclosure relates to imaging semiconductor wafers to find defects, and more specifically to detecting and/or classifying defects using context attributes.

BACKGROUND

In semiconductor defect inspection, both signal and noise change according to a pattern (e.g., circuit pattern) at and around a location being imaged on a semiconductor die. The term "context" refers to the pattern at and around the location in the present layer of the die and possibly in one or more previous layers of the die. Actions of defect-detection algorithms and defect-classification algorithms may change according to the context. Context attributes are variables that encode or distill the context for such algorithms.

Context attributes are traditionally calculated from optical images of a semiconductor wafer. Intensity, contrast, and other properties of these optical images change, however, from wafer to wafer on nominally identical wafers and across a wafer on nominally identical die on the wafer. These changes are caused by process variation, such as variation in layer thicknesses, dimensions, and shapes of features in an integrated circuit within acceptable tolerances. These changes do not necessarily correspond to defectivity. When optical images vary, context attributes derived from them also vary, causing detection and classification decisions made using the context attributes to vary. This variation is undesirable because it does not correlate to defectivity.

SUMMARY

Context attributes that are independent from process variations may be calculated by convolving the pattern with kernels that represent the response of an imaging system. The resulting context attributes may be used to find defects. For example, the context attributes may be used for defect classification and/or care-area identification.

In some embodiments, a method includes calculating context attributes for optical imaging of a patterned layer of a semiconductor die. Calculating the context attributes includes calculating convolutions of a pattern of the patterned layer with respective kernels of a plurality of kernels, wherein the plurality of kernels is orthogonal. The method also includes finding defects on the semiconductor die in accordance with the context attributes.

In some embodiments, a non-transitory computer-readable storage medium stores one or more programs for execution by one or more processors of a system that includes an optical inspection tool. The one or more programs include instructions for calculating context attributes for optical imaging of a patterned layer of a semiconductor die. Calculating the context attributes includes calculating convolutions of a pattern of the patterned layer with respective kernels of a plurality of kernels, wherein the plurality of kernels is orthogonal. The one or more programs also include instructions for finding defects on the semiconductor die using the optical imaging tool, in accordance with the context attributes.

In some embodiments, a system includes an optical inspection tool, one or more processors, and memory storing one or more programs for execution by the one or more processors. The one or more programs include instructions for calculating context attributes for optical imaging of a patterned layer of a semiconductor die. Calculating the context attributes includes calculating convolutions of a pattern of the patterned layer with respective kernels of a plurality of kernels, wherein the plurality of kernels is orthogonal. The one or more programs also include instructions for finding defects on the semiconductor die using the optical imaging tool, in accordance with the context attributes.

BRIEF DESCRIPTION OF THE DRAWINGS

For a better understanding of the various described implementations, reference should be made to the Detailed Description below, in conjunction with the following drawings.

FIG. 9 is a flowchart showing a method of finding semiconductor defects in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
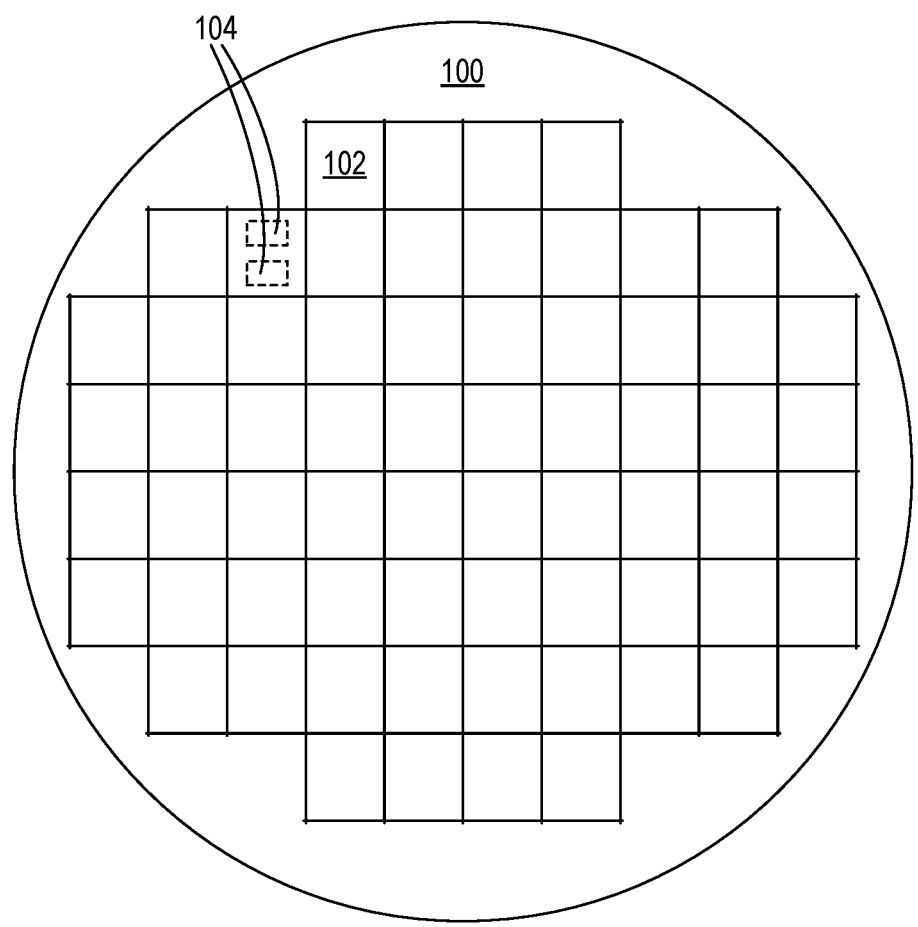
FIG. 1 is a plan view of a semiconductor wafer divided into a plurality of nominally identical semiconductor die.
Figure 2:
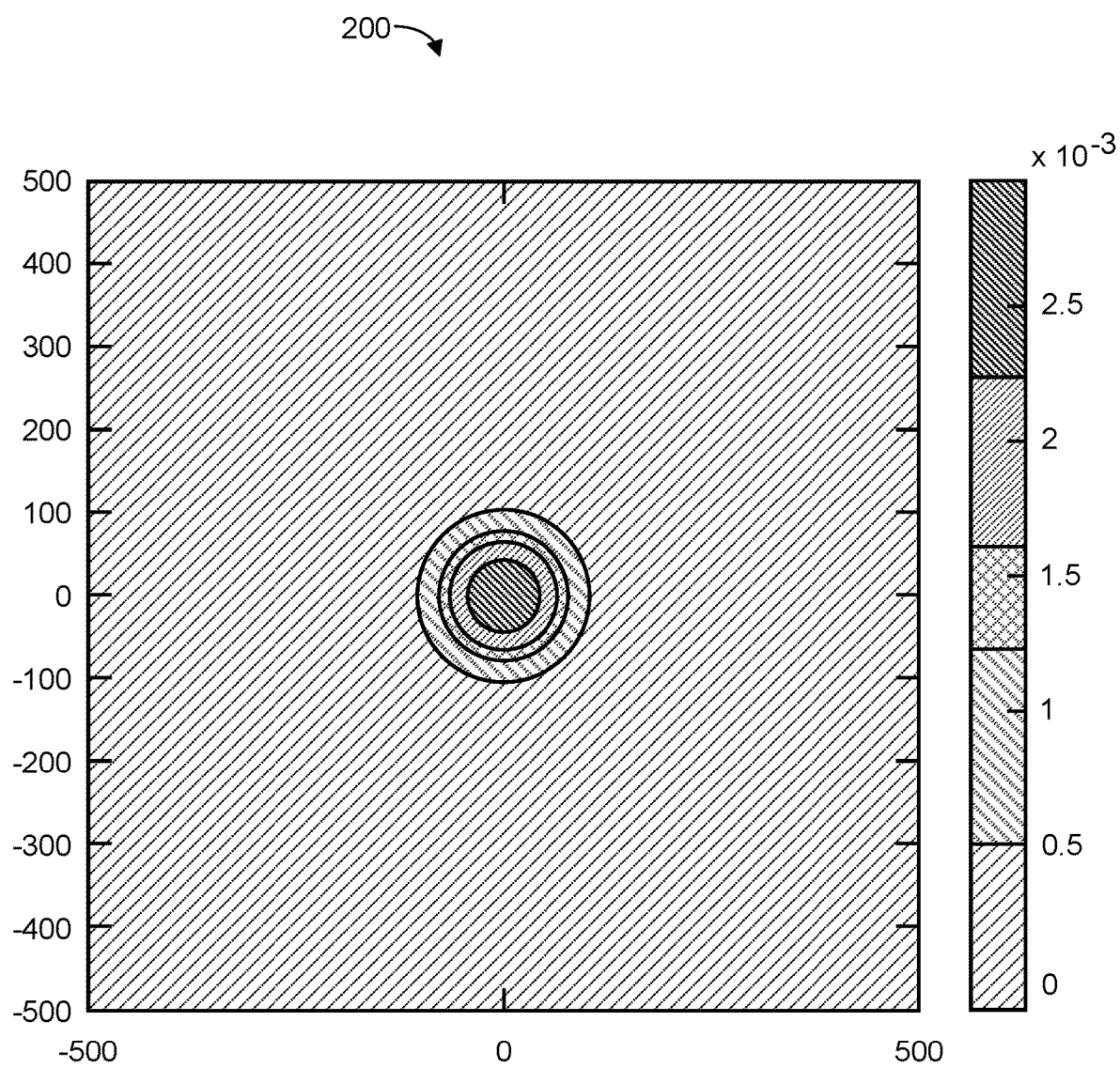
FIGS. 2-6 are graphs showing the first five kernels of an imaging system that operates at a wavelength of 193 nm and has a numerical aperture of 0.85, in accordance with some embodiments.
Figure 3:
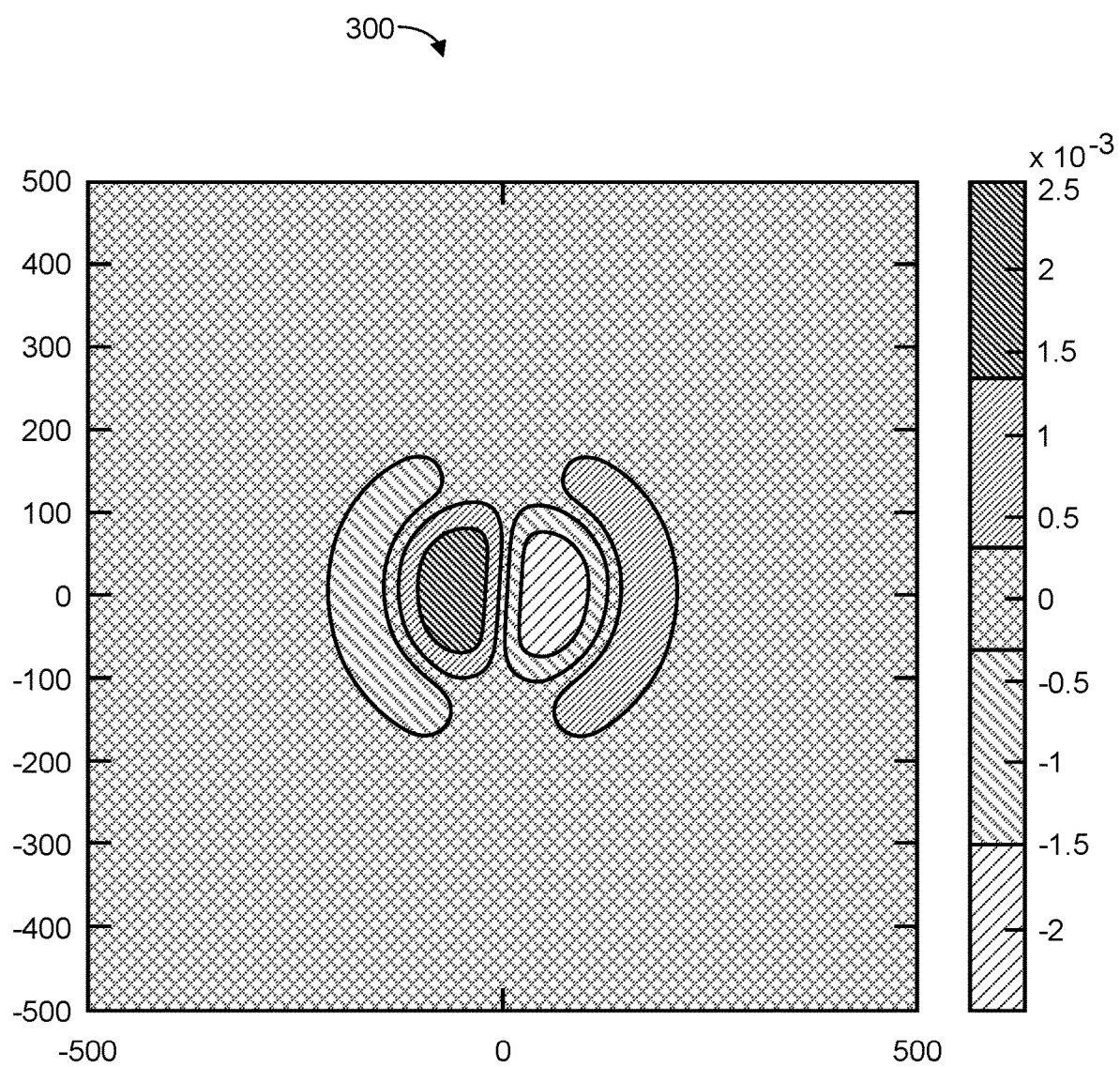
Figure 4:
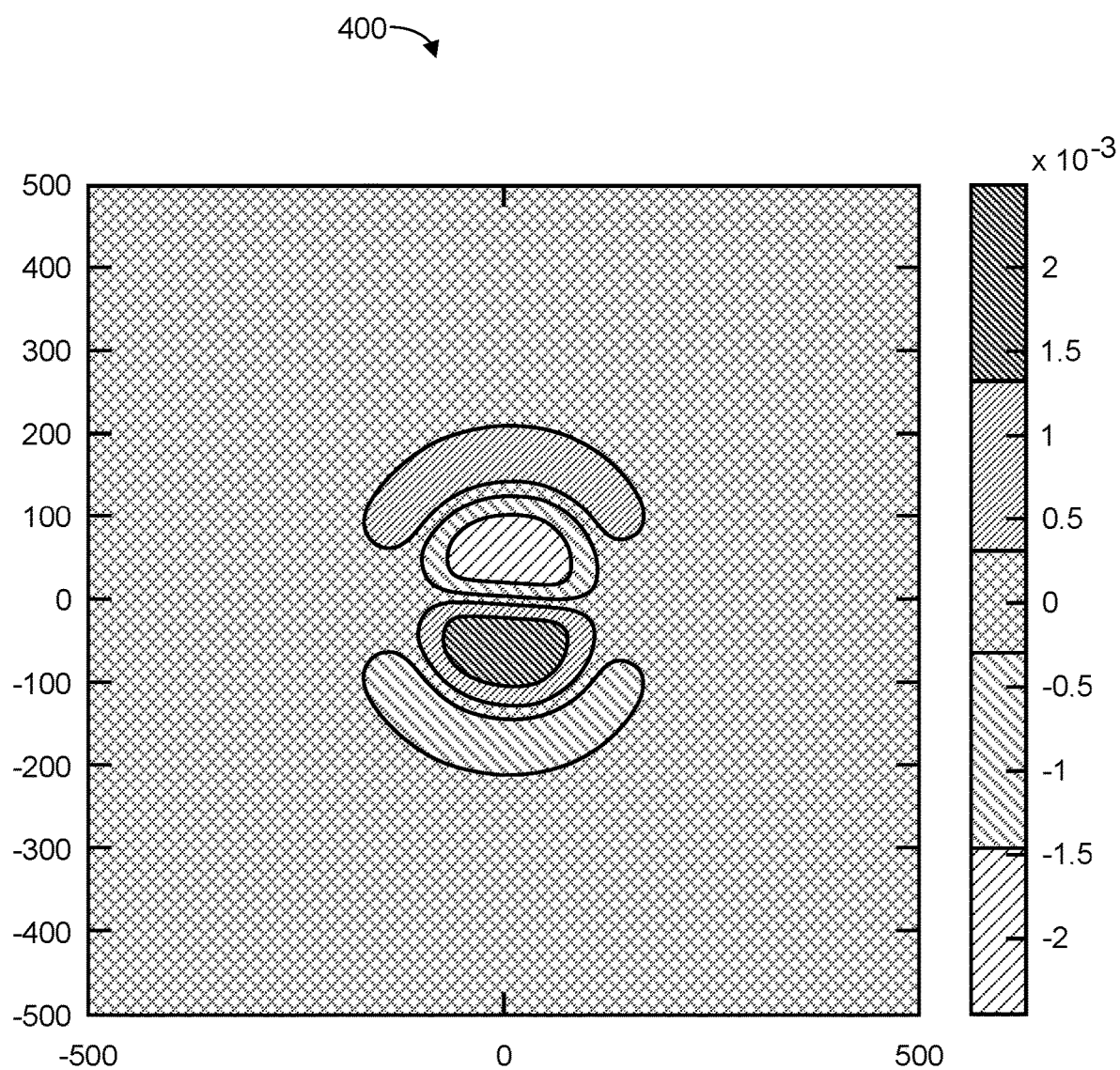
Figure 5:
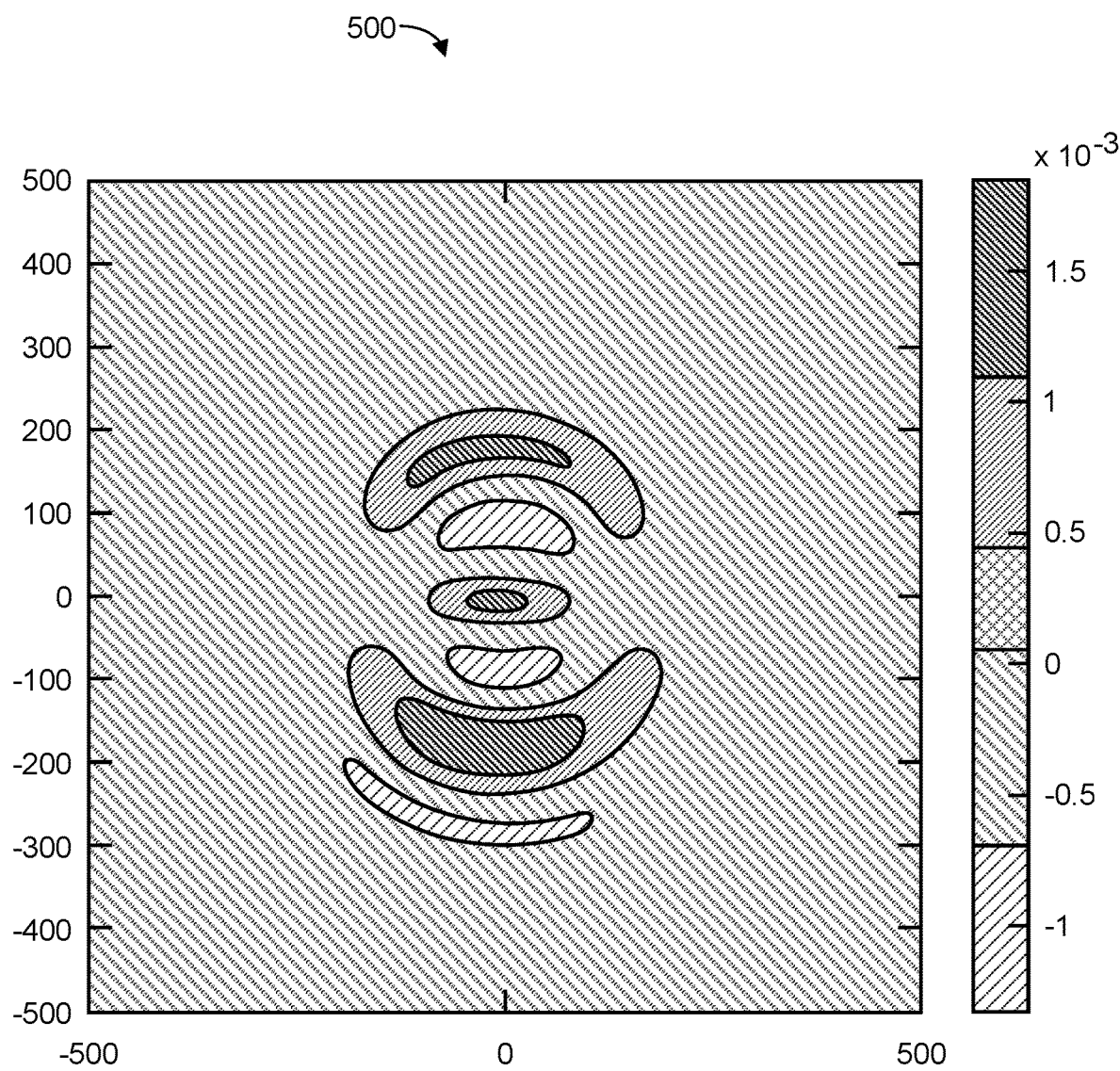

FIG. 1 is a plan view of a semiconductor wafer 100. The wafer 100 is divided into a plurality of semiconductor die 102. The semiconductor die 102 are nominally identical (e.g., are nominally identical instances of the same integrated circuit): they are fabricated based on the same design, using the same semiconductor fabrication process. While nominally identical, however, differences may exist between different semiconductor die 102. First, process variation across the wafer 100 may cause differences in parameters such as layer thicknesses, dimensions, and feature shapes both between and within semiconductor die 102. Second, defects may be present in different locations (e.g., random locations) on different semiconductor die 102.

Optical imaging may be performed to find defects on the semiconductor wafer 100. Before performing optical imaging, care areas 104 are identified on the semiconductor die 102. The care areas 104 are areas of particular interest for finding defects. Defect detection and/or classification may be performed differently for the care areas 104 than for other areas on the semiconductor die 102. For example, a higher defect-detection sensitivity may be used for the care areas 104 than for the other areas.

Process variation is a source of noise for optical imaging: in addition to finding actual defects, referred to as defects of interest (DOI), optical imaging also picks up nuisance defects that result from process variation. The nuisance defects are not typically of interest to engineers, because they do not render the semiconductor die 102 non-functional. Nuisance defects may outnumber defects of interests, sometimes by several orders of magnitude. Defect classification is performed to determine which defects are defects of interest and which are nuisance defects.

Defects may be found using context attributes calculated by convolving the pattern for a particular layer of the semiconductor die 102 (e.g., the top layer at the time optical imaging is performed, which is referred to as the present layer) with respective kernels from a plurality of kernels that represent the response of an optical imaging system. The plurality of kernels are orthogonal functions used in an integral transform that encodes or distills pattern information. The context attributes may be used, for example, for defect classification and/or care-area identification. Such context attributes avoid variation based on process variation.

The pattern for a particular layer of the semiconductor die 102 (e.g., of the integrated circuit on the semiconductor die 102) is described by a set of polygons. The polygons are specified (i.e., contained) in the design database. The design database may specify the polygons for every patterned layer of the semiconductor die 102. The polygons of a particular patterned layer/define a binary-valued function in the plane of the semiconductor wafer 100 (i.e., in the x-y plane):

$$p_l(x, y) = \begin{cases} 1, & \text{if } (x, y) \text{ is in a polygon of layer } l \\ 0, & \text{if } (x, y) \text{ is not in any of the polygons of layer } l \end{cases} \quad (1)$$

In some embodiments, the kernels represent the response of the optical imaging system (e.g., optical inspection tool 1330, FIG. 13), including its illumination pupil distribution, numerical aperture, and wavelength spectrum. The image of the semiconductor die 102, as taken by the optical imaging system, depends on the convolutions of the pattern with the kernels. These convolutions contain all the information about the pattern that the optical imaging system has. These quantities are therefore ideal context attributes:

$$c_{l,n} = p_l \otimes \psi_n \quad (2)$$

where $\otimes$ is the convolution operator, $\psi_n$ in the nth kernel; n is an integer with values ranging from 1 to N, N being the number of kernels; and $c_{l,n}$ is the context attribute for the lth patterned layer and nth kernel. In some embodiments, N has a value in the range of 4-8. In the example of equation 2, each context attribute $c_{l,n}$ is thus equal to the convolution of a pattern of the lth patterned layer with the nth kernel of a plurality of kernels.

In some embodiments, respective context attributes are functions of convolutions of the pattern of a particular patterned layer with respective kernels. For example, each context attribute $c_{l,n}$ may equal the square of the magnitude of the convolution of a pattern of the lth patterned layer with the nth kernel of a plurality of kernels:

$$c_{l,n} = |p_l \otimes \psi_n|^2 \quad (3)$$

The kernels form a basis (e.g., a complete, orthonormal basis) for a space corresponding to the optical imaging system. In some embodiments, the kernels are Hermite Gaussian functions (i.e., Hermite polynomials with Gaussian weights). In some embodiments, the kernels are basis functions for a Gabor transform. Other examples of kernels are possible.

Each context attribute $c_{l,n}$ may be an entry (i.e., component) in an attribute vector. A respective entry (e.g., each entry) in the attribute vector thus is the convolution, or a function of the convolution, of the pattern of a layer and a respective kernel of the optical imaging system. In some embodiments, the context attributes include convolutions only for the layer being inspected (i.e., the present layer) and do not include any convolutions for previous (i.e., lower) layers on the semiconductor die 102. Alternatively, multiple layers are considered and the attribute vector includes cross-terms, for example:

$$c = (p_{l-1} \otimes \psi_n)^* p_l \otimes_m \quad (4)$$

where $p_{l-1}$ is the pattern of the previous layer (i.e., the (l-1)th layer), $\psi_n$ is a kernel for the previous layer, $p_l$ is the pattern of the present layer, and $\psi_m$ is a kernel for the present layer.

Figure 6:
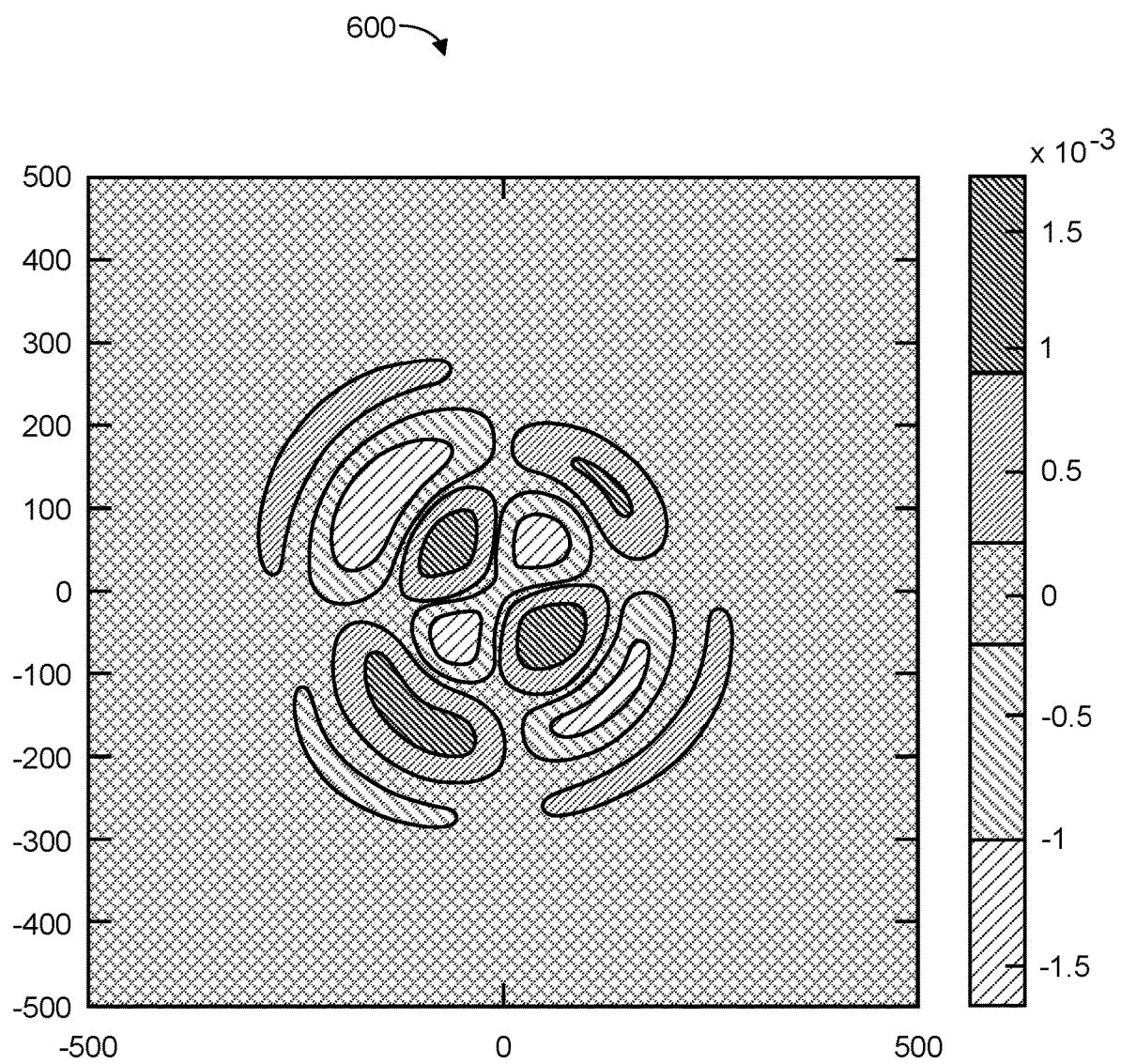

FIGS. 2-6 are graphs showing the first five kernels of an imaging system that operates at a wavelength of 193 nm and has a numerical aperture of 0.85, in accordance with some embodiments. These first five kernels include a first kernel 200 (FIG. 2), a second kernel 300 (FIG. 3), a third kernel 400 (FIG. 4), a fourth kernel 500 (FIG. 5), and a fifth kernel 600 (FIG. 6). The graphs of FIGS. 2-6 are heat maps with the x- and y-axes each ranging from −500 nm to 500 nm and the kernel values represented by fill patterns. (Heat maps typically use colors instead of fill patterns to represent values.) Respective kernels may serve as filters. For example, a vertical line with an edge positioned at x=0 and a width at least on the order of the extent of the second kernel 300 (FIG. 3) will result in the convolution of the pattern with the second kernel 300 having a large magnitude. Use of the second kernel 300 thus allows variation in the thickness of the vertical line (e.g., edge roughness for the vertical line) to be filtered out, thereby eliminating nuisance defects resulting from the variation in the thickness of the vertical line. Similarly, a horizontal line with an edge positioned at y=0 and a width at least on the order of the extent of the third kernel 400 (FIG. 4) will result in the convolution of the pattern with the third kernel 400 having a large magnitude. Use of the third kernel 400 thus allows variation in the thickness of the horizontal line (e.g., edge roughness for the horizontal line) to be filtered out, thereby eliminating nuisance defects resulting from the variation in the thickness of the horizontal line.

A machine-learning system (e.g., implemented using instructions in the memory 1310, FIG. 13) may be used to apply the context attributes to finding defects, and thus to consume the context attributes. This machine-learning system may also calculate the context attributes (e.g., in accordance with equations 2, 3, and/or 4), which includes calculating the convolutions. For example, the machine-learning system creates the attribute vector.

Figure 7:
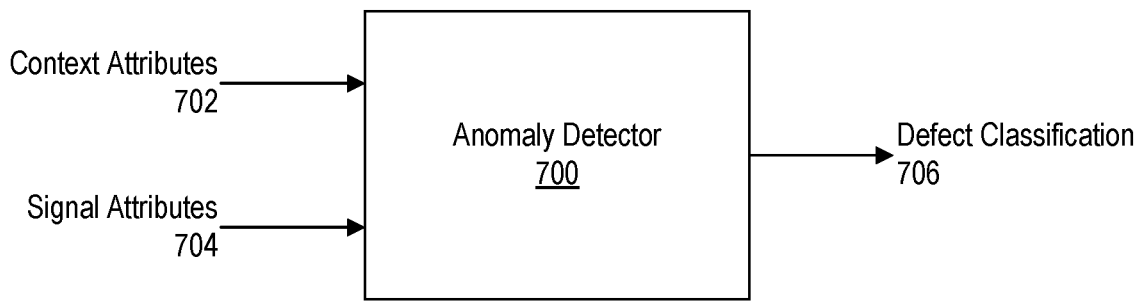
FIG. 7 is a block diagram of an anomaly detector in a machine-learning system, in accordance with some embodiments.

FIG. 7 is a block diagram of an anomaly detector 700 in a machine-learning system, in accordance with some embodiments. The anomaly detector 700 is a machine-learning model trained to classify defects. The anomaly detector 700 may be implemented, for example and without limitation, as a random forest (i.e., random decision forest) or neural network (e.g., convolutional neural network). In some embodiments, the anomaly detector 700 is trained to distinguish between defects of interest and nuisance defects. Context attributes 702 (e.g., an attribute vector) and one or more signal attributes 704 are provided as inputs (e.g., as an input tuple) to the anomaly detector 700, which provides defect classifications 706 in response. The defect classifications 706 classify respective defects (e.g., as defects of interest or nuisance defects) detected by the optical imaging system.

The context attributes 702 include convolutions of the pattern of a particular patterned layer with respective kernels and/or functions of convolutions of the pattern of a particular patterned layer with respective kernels. For example, the context attributes 702 include context attributes calculating using equations 2, 3, and/or 4. The signal attributes 704, which are also referred to as difference-image attributes, are attributes of the difference image, which is the image generated by comparing the target image of a semiconductor die 102, as taken by the optical imaging system, to a reference image for the semiconductor die 102 (e.g., by subtracting the reference image from the target image, or vice-versa, on a pixel-by-pixel basis). One example of a signal attribute 704 is spot likeness, which is defined as the peak value (e.g., gray-scale value) of a spot in the difference image divided by the standard deviation of the extent of the spot. The context attributes 702 (e.g., the attribute vector) and the spot likeness may be provided (e.g., as an input tuple) to the anomaly detector 700.

The anomaly detector 700 is trained during a training process in which context attributes 702 and signal attributes 704 for defects having known classifications are provided to the anomaly detector 700. In some embodiments, the defect classifications 706 produced by the anomaly detector 700 are compared to the known classifications, and the anomaly detector 700 is adjusted accordingly until the defect classifications 706 converge with the known classifications. In some embodiments, only nuisance defects (i.e., non-defective cases) are used in the training process: the anomaly detector 700 learns the distribution of nuisance defects in the space of the context attributes 702 and one or more signal attributes 704. During operation, the anomaly detector 700 determines whether a defect falls within this distribution (i.e., whether the context attributes 702 and signal attribute(s) 704 for the defect fall within this distribution) and thus whether the defect is a nuisance defect or defect of interest. Training the anomaly detector 700 using only nuisance defects is desirable because nuisance defects far outnumber defects of interest, which are rare by comparison.

Figure 8:
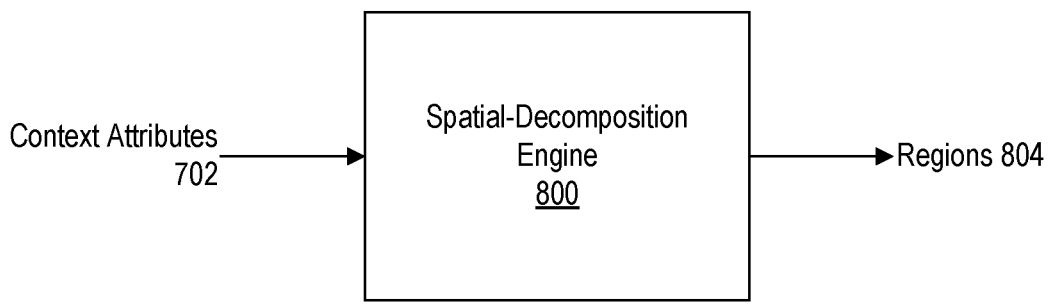
FIG. 8 is a block diagram of a spatial-decomposition engine in a machine-learning system, in accordance with some embodiments.

FIG. 8 is a block diagram of a spatial-decomposition engine 800 in a machine-learning system, in accordance with some embodiments. The spatial-decomposition engine 800 is a machine-learning model trained to identify regions on a semiconductor die 102 (e.g., in a layer of a semiconductor die 102). For example, the spatial-decomposition engine 800 may be used (i.e., has been trained) to identify care areas 104 (FIG. 1) on a semiconductor die 102. The spatial-decomposition engine 800 may be implemented, for example and without limitation, as a random forest (i.e., random decision forest) or neural network (e.g., convolutional neural network). Context attributes 702 (e.g., an attribute vector) are provided as inputs (e.g., as an input tuple) to the spatial-decomposition engine 800, which performs spatial decomposition and specifies distinct regions (e.g., care areas) on the semiconductor die 102 in response.

The spatial-decomposition engine 800 is trained during a training process in which context attributes 702 for known regions (e.g., user-identified regions) are provided to the spatial-decomposition engine 800. Regions 804 specified by the spatial-decomposition engine 800 are compared to the known regions (e.g., care areas and non-care areas), and the spatial-decomposition engine 800 is adjusted accordingly until convergence is achieved.

Figure 13:
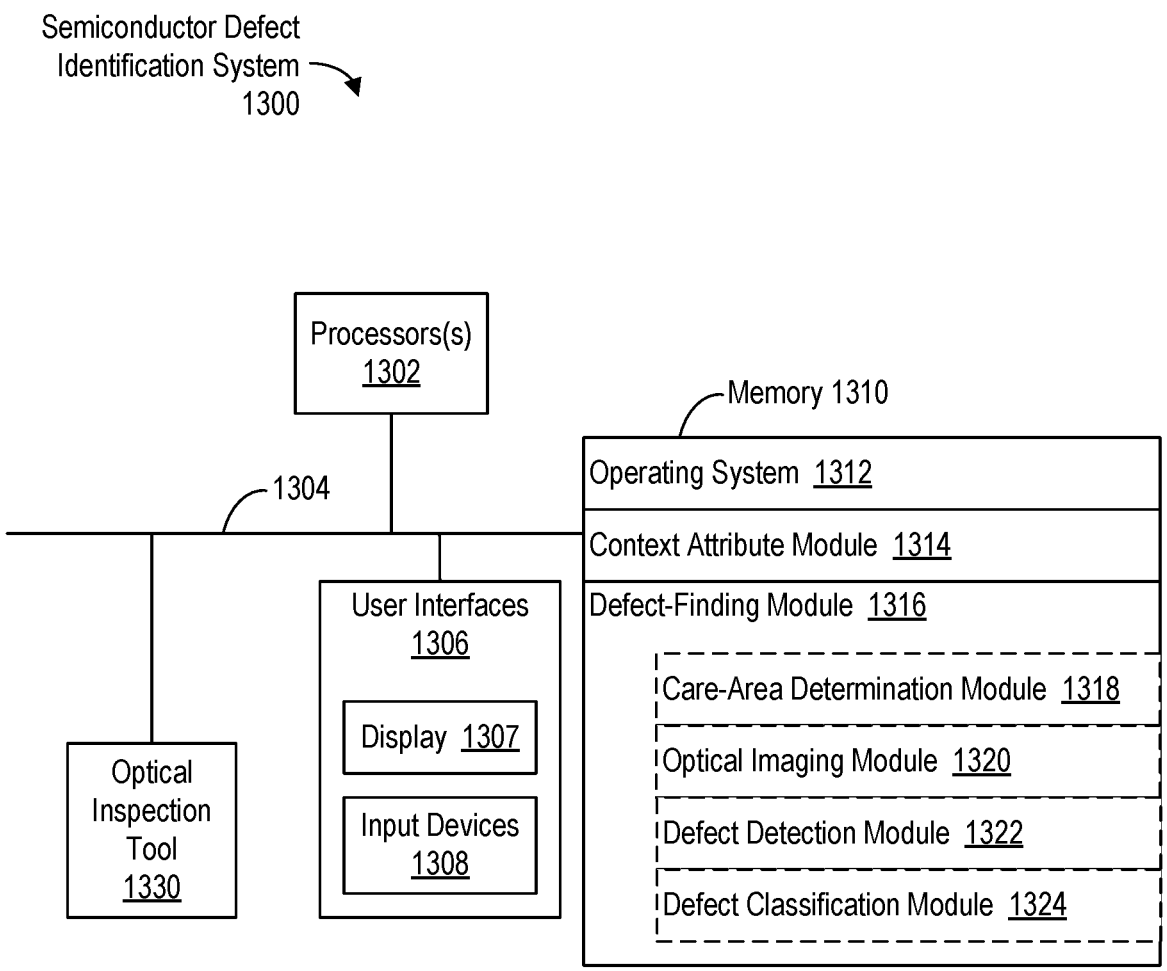
FIG. 13 is a block diagram of a semiconductor defect identification system in accordance with some embodiments.

FIG. 9 is a flowchart showing a method 900 of finding semiconductor defects in accordance with some embodiments. The method 900 may be performed by a semiconductor defect identification system 1300 (FIG. 13). In the method 900, context attributes for optical imaging of a patterned layer of a semiconductor die 102 (FIG. 1) are calculated (902). Calculating the context attributes includes calculating convolutions of a pattern of the patterned layer with respective kernels of a plurality of kernels (e.g., using equations 2 and/or 3). The plurality of kernels is orthogonal. In some embodiments, the plurality of kernels is (904) Hermite Gaussian functions. In some other embodiments, the plurality of kernels is (906) for a Gabor transform. These are merely two examples of kernels; other examples are possible.

The patterned layer is a first patterned layer (e.g., the present patterned layer, which is being optically inspected), the pattern is a first pattern (i.e., a pattern of the first patterned layer), and the plurality of kernels is a first plurality of kernels. In some embodiments, calculating the context attributes includes calculating (908) cross-terms (e.g., using equation 4) between convolutions of the first pattern with respective kernels of the first plurality of kernels and convolutions of a second pattern of a second patterned layer (i.e., a layer below the present layer, such as immediately below the present layer) with respective kernels of a second plurality of kernels. The second plurality of kernels is orthogonal. For example, the second plurality of kernels is Hermite Gaussian functions or orthogonal functions for a Gabor transform.

Defects are found (910) for the semiconductor die in accordance with the context attributes. For example, defects are filtered out and/or classified using the context attributes, and/or care areas are identified using the context attributes.

Figure 10:
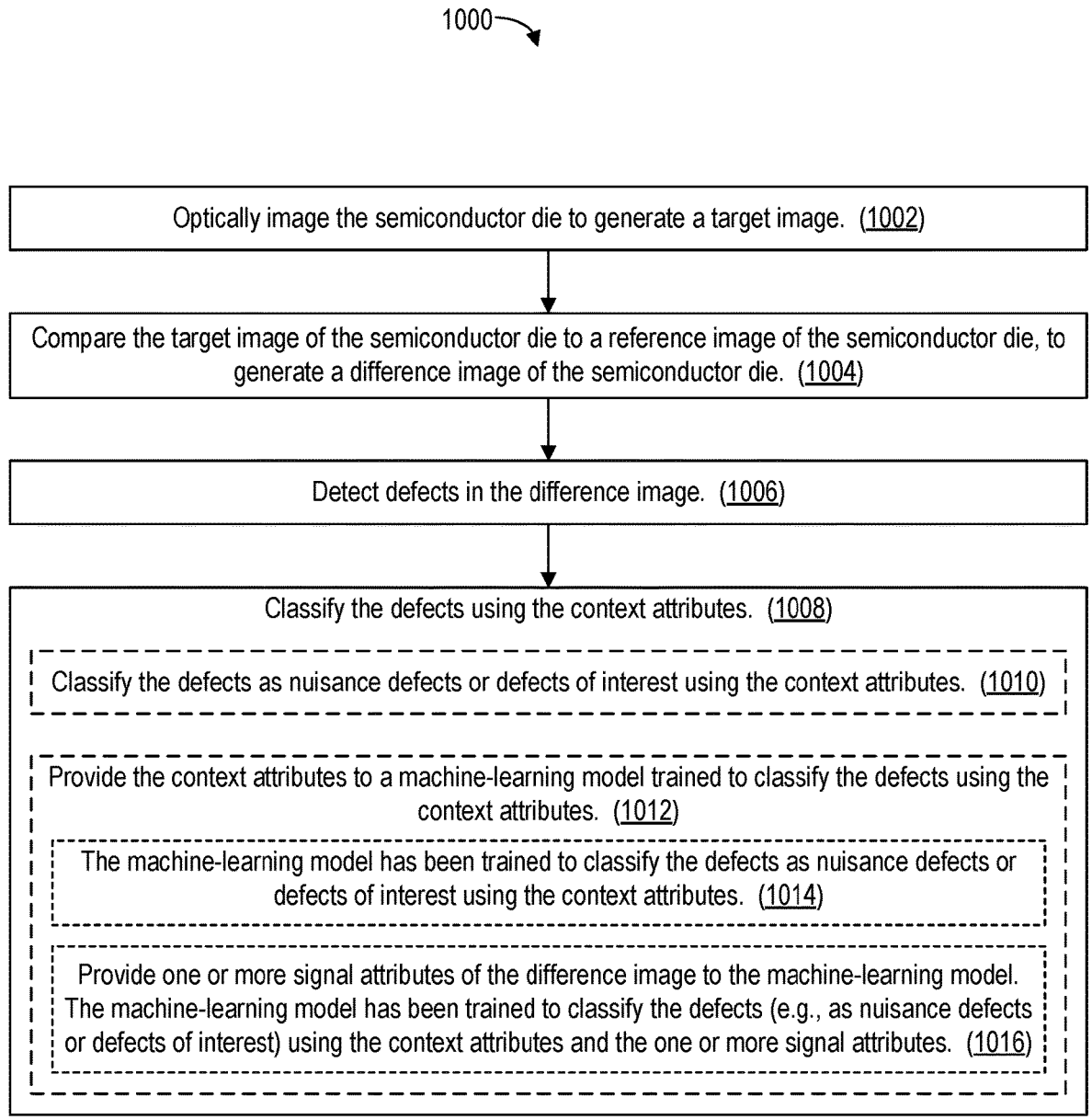
FIG. 10 is a flowchart showing a method of finding defects in accordance with the context attributes, in which the context attributes are used to classify defects, in accordance with some embodiments.

FIG. 10 is a flowchart showing a method 1000 of finding defects in accordance with the context attributes, in which the context attributes are used to classify defects, in accordance with some embodiments. The method 1000 is an example of finding (910) defects in the method 900 (FIG. 9). The method 1000 may be performed by a semiconductor defect identification system 1300 (FIG. 13).

In the method 1000, the semiconductor die 102 is optically imaged (1002) (e.g., using the optical inspection tool

1330, FIG. 13) to generate a target image. The target image of the semiconductor die 102 is compared (1004) to a reference image of the semiconductor die 102 to generate a difference image of the semiconductor die. Defects are detected (1006) in the difference image.

The defects are classified (1008) using the context attributes. In some embodiments, the defects are classified (1010) as nuisance defects or defects of interest using the context attributes (e.g., each defect is classified as either a nuisance defect or a defect of interest). In some embodiments, the context attributes are provided (1012) to a machine-learning model (e.g., anomaly detector 700, FIG. 7) that classifies the defects using the context attributes (e.g., context attributes 702, FIG. 7). For example, the machine-learning model has been trained to classify the defects as nuisance defects or defects of interest using the context attributes. The machine-learning model may have been trained using nuisance defects (i.e., known nuisance defects, which may have been user-classified as nuisance defects) and not using defects of interest. Alternatively, the machine-learning model may have been trained using both nuisance defects and defects of interest.

In some embodiments, one or more signal attributes of the difference image (e.g., signal attribute(s) 704, FIG. 7) (e.g., spot likeness) are provided (1016) to the machine-learning model, in addition to the context attributes. The machine-learning model has been trained to classify the defects (e.g., as nuisance defects or defects of interest) using the context attributes and the one or more signal attributes.

In some embodiments, classifying (1010) the defects is performed offline, after the optical inspection is complete. For example, defects detected in step 1006 are stored in a database, which is analyzed (e.g., using the machine-learning model) offline to classify the defects. Alternatively, the defects are classified in step 1010 in real-time while the optical inspection is being performed, and some defects (e.g., those defects classified as nuisance defects) are filtered out and not stored in the database, thereby saving memory.

Figure 11:
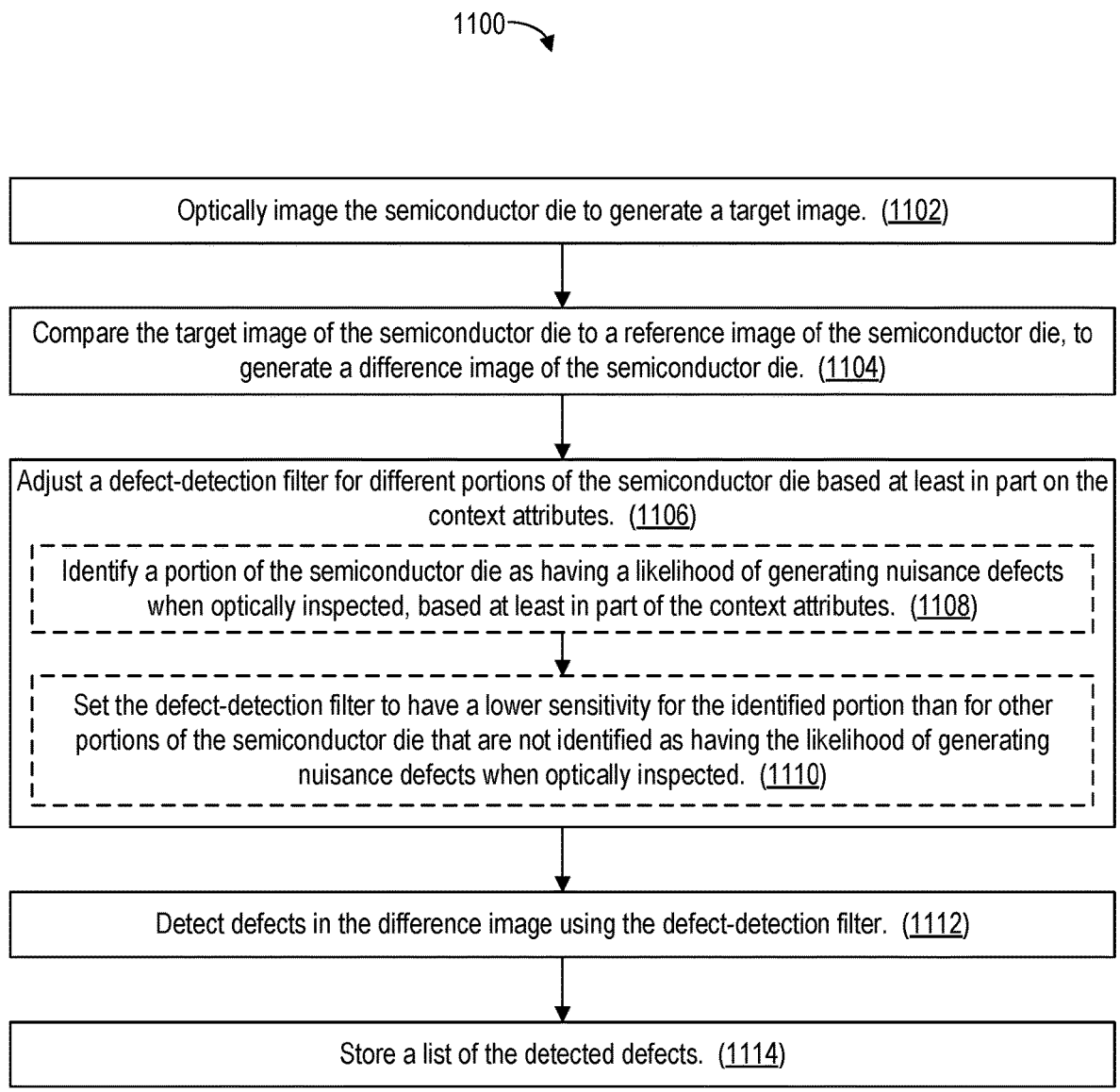
FIG. 11 is a flowchart showing a method of finding defects in accordance with the context attributes, in which operation of a defect-detection filter depends on the context attributes, in accordance with some embodiments.

FIG. 11 is a flowchart showing a method 1100 of finding defects in accordance with the context attributes, in which operation of a defect-detection filter depends on the context attributes, in accordance with some embodiments. The method 1100 is an example of finding (910) defects in the method 900 (FIG. 9). The method 1100 may be performed by a semiconductor defect identification system 1300 (FIG. 13).

In the method 1100, the semiconductor die 102 is optically imaged (1102) (e.g., using the optical inspection tool 1330, FIG. 13) to generate a target image. The target image of the semiconductor die 102 is compared (1104) to a reference image of the semiconductor die 102 to generate a difference image of the semiconductor die.

A defect-detection filter is adjusted (1106) for different portions of the semiconductor die based at least in part on the context attributes. In some embodiments, a portion of the semiconductor die (e.g., a particular region) is identified (1108) as having a likelihood of generating nuisance defects when optically inspected, based at least in part of the context attributes. This portion may be identified by a machine-learning model (e.g., the spatial-decomposition engine 800, FIG. 8) that receives the context attributes (e.g., context attributes 702, FIG. 8) as input. In response, the defect-detection filter is set (1110) to have a lower sensitivity for the identified portion than for other portions of the semiconductor die that are not identified as having the likelihood of generating nuisance defects when optically inspected.

Defects in the difference image are detected (1112) using the defect-detection filter. A list of the detected defects is stored (1114), for example in a database. Fewer defects are thus detected in the portion that has a likelihood of generating nuisance defects than in other portions (e.g., regions) of the semiconductor die, thereby filtering out nuisance defects and causing fewer nuisance defects to be stored in the list, which saves memory. The defects stored in the list may subsequently be classified (e.g., as in step 1008 of the method 1000, FIG. 10).

Figure 12:
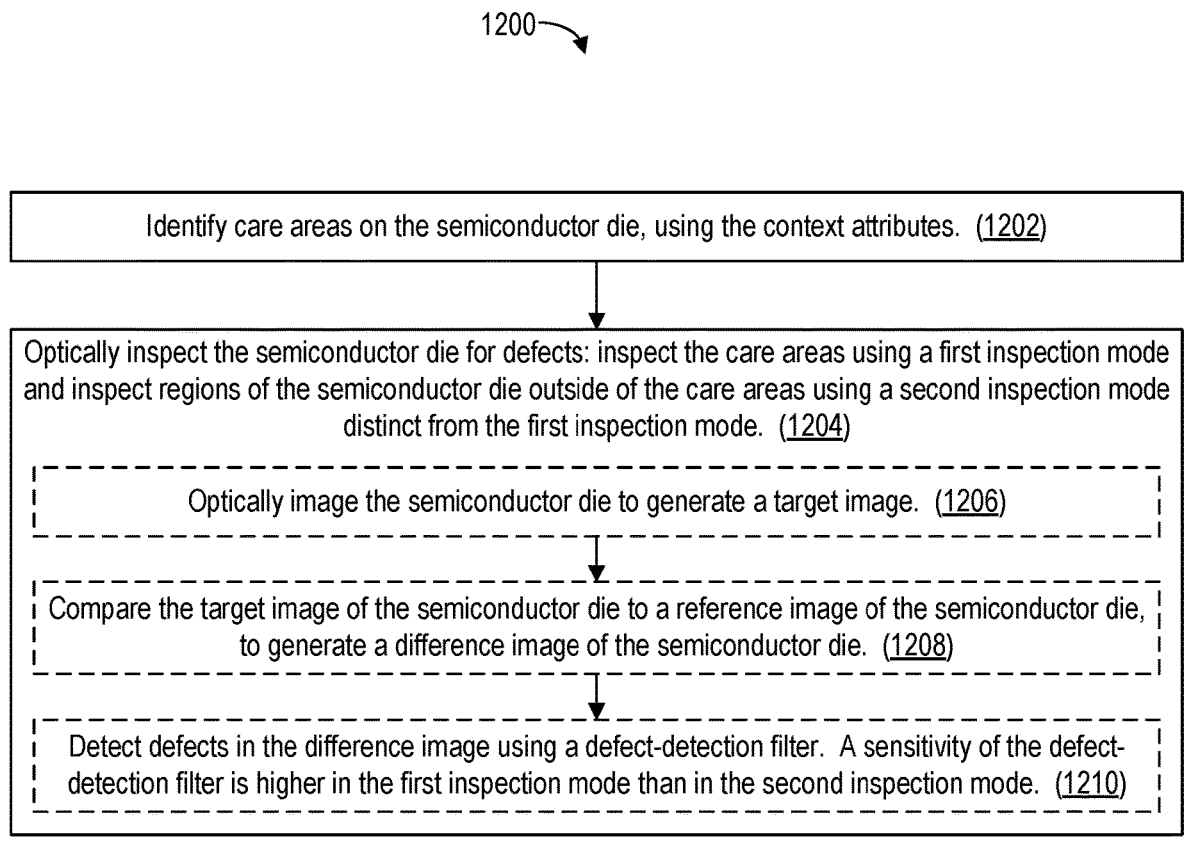
FIG. 12 is a flowchart showing a method of finding defects in accordance with the context attributes, in which the context attributes are used to identify care areas, in accordance with some embodiments.

FIG. 12 is a flowchart showing a method 1200 of finding defects in accordance with the context attributes, in accordance with some embodiments. The method 1200 is an example of finding (910) defects in the method 900 (FIG. 9). The method 1200 may be performed by a semiconductor defect identification system 1300 (FIG. 13).

In the method 1200, care areas 104 (FIG. 1) on the semiconductor die 102 are identified (1202) using the context attributes. For example, the care areas 104 are identified using a machine-learning model (e.g., the spatial-decomposition engine 800, FIG. 8).

The semiconductor die 102 is optically inspected (1204) for defects. The care areas 104 are inspected using a first inspection mode and regions of the semiconductor die outside of the care areas 104 are inspected using a second inspection mode distinct from the first inspection mode. The first inspection mode may be more sensitive than the second inspection mode, thus increasing the probability of detecting defects of interest in the care areas 104 while decreasing the number of nuisance defects detected in other areas.

In some embodiments, to optically inspect (1204) the semiconductor die 102, the semiconductor die 102 is optically imaged (1206) (e.g., using the optical inspection tool 1330, FIG. 13) to generate a target image. The target image of the semiconductor die 102 is compared (1208) to a reference image of the semiconductor die, to generate a difference image of the semiconductor die. Defects in the difference image are detected (1210) using a defect-detection filter. A sensitivity of the defect-detection filter is higher in the first inspection mode than in the second inspection mode. For example, the defect-detection filter is adjusted as in step 1106 of the method 1100 (FIG. 11).

The method 1200 may be combined with the methods 1000 (FIG. 10) and/or 1100 (FIG. 11).

FIG. 13 is a block diagram of a semiconductor defect identification system 1300 in accordance with some embodiments. The semiconductor defect identification system 1300 includes an optical inspection tool 1330 and a computer system with one or more processors 1302 (e.g., CPUs), user interfaces 1306, memory 1310, and communication bus(es) 1304 interconnecting these components. In some embodiments, the optical inspection tool 1330 is communicatively coupled to the computer system through one or more wired and/or wireless networks. In some embodiments, the semiconductor defect identification system 1300 includes multiple optical inspection tools 1330 communicatively coupled with the computer system. The computer system may further include one or more wired and/or wireless network interfaces for communicating with the optical inspection tool(s) 1330 and/or remote computer systems.

The user interfaces 1306 may include a display 1307 and one or more input devices 1308 (e.g., a keyboard, mouse, touch-sensitive surface of the display 1307, etc.). The display 1307 may display results, including defect-detection and/or defect classification results.

Memory 1310 includes volatile and/or non-volatile memory. Memory 1310 (e.g., the non-volatile memory within memory 1310) includes a non-transitory computer-readable storage medium. Memory 1310 optionally includes one or more storage devices remotely located from the processors 1302 and/or a non-transitory computer-readable storage medium that is removably inserted into the system 1300. The memory 1310 (e.g., the non-transitory computer-readable storage medium of the memory1310) includes instructions for performing the method 900 (FIG. 900), including for example the methods 1000 (FIG. 10), 1100 (FIG. 11), and/or 1200 (FIG. 12). The computer system of the semiconductor defect identification system 1300 may implement the machine-learning system of FIGS. 7 and/or 8 by executing instructions stored in the memory 1310.

In some embodiments, memory 1310 (e.g., the non-transitory computer-readable storage medium of memory 1310) stores the following modules and data, or a subset or superset thereof: an operating system 1312 that includes procedures for handling various basic system services and for performing hardware-dependent tasks, a context attribute module 1314 for calculating context attributes (e.g., context attributes 702, FIGS. 7-8), and a defect-finding module 1316 for performing defect detection on semiconductor die 102 of semiconductor wafers 100 (FIG. 1). The context attribute module 1314 includes instructions for calculating convolutions of a pattern of the patterned layer with respective kernels of a plurality of orthogonal kernels (e.g., instructions for performing step 902 in the method 900, FIG. 9). In some embodiments, the defect-finding module 1316 includes a care-area determination module 1318 (e.g., with instructions for performing step 1202 of the method 1200, FIG. 12), an optical imaging module 1320 (e.g., with instructions for performing steps 1002, 1102, and/or 1206 of the methods 1000, 1100, and 1200, FIGS. 10-12), a defect detection module 1322 (e.g., with instructions for performing steps 1004 and 1006 of the method 1000, FIG. 10; for performing steps 1104, 1106, 1112, and 1114 of the method 1100, FIG. 11; and/or for performing steps 1208 and 1210 of the method 1200, FIG. 12), and a defect classification module 1324 (e.g., with instructions for performing step 1008 of the method 1000, FIG. 10).

Each of the modules stored in the memory 1310 corresponds to a set of instructions for performing one or more functions described herein. Separate modules need not be implemented as separate software programs. The modules and various subsets of the modules may be combined or otherwise re-arranged. In some embodiments, the memory 1310 stores a subset or superset of the modules and/or data structures identified above.

FIG. 13 is intended more as a functional description of various features that may be present in a semiconductor defect identification system than as a structural schematic. For example, the functionality of the computer system in the semiconductor defect identification system 1300 may be split between multiple devices. A portion of the modules stored in the memory 1310 may alternatively be stored in one or more other computer systems communicatively coupled with the computer system of the semiconductor defect identification system 1300 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    calculating context attributes for optical imaging of a patterned layer of a semiconductor die, comprising calculating convolutions of a pattern of the patterned layer with respective kernels of a plurality of kernels, wherein the plurality of kernels is orthogonal; and
    finding defects on the semiconductor die in accordance with the context attributes, comprising:
        optically imaging the semiconductor die to generate a target image;
        comparing the target image of the semiconductor die to a reference image of the semiconductor die, to generate a difference image of the semiconductor die;
        adjusting a defect-detection filter for different portions of the semiconductor die based at least in part on the context attributes;
        detecting defects in the difference image using the defect-detection filter; and
        storing a list of the detected defects.

2. The method of claim 1, wherein the plurality of kernels is Hermite Gaussian functions.

3. The method of claim 1, wherein the plurality of kernels is for a Gabor transform.

4. The method of claim 1, wherein:
    the patterned layer is a first patterned layer;
    the pattern is a first pattern;
    the plurality of kernels is a first plurality of kernels;
    calculating the context attributes further comprises calculating cross-terms between the convolutions of the first pattern with the respective kernels of the first plurality of kernels and convolutions of a second pattern of a second patterned layer of the semiconductor die with respective kernels of a second plurality of kernels; and
    the second plurality of kernels is orthogonal.

5. The method of claim 1, wherein finding defects on the semiconductor die in accordance with the context attributes further comprises:
    classifying the detected defects using the context attributes.

6. The method of claim 5, wherein the classifying comprises classifying the detected defects as nuisance defects or defects of interest using the context attributes.

7. The method of claim 6, wherein the classifying comprises providing the context attributes to a machine-learning model trained to classify the detected defects as nuisance defects or defects of interest using the context attributes.

8. The method of claim 7, wherein the machine-learning model is trained using nuisance defects.

9. The method of claim 7, wherein:
    the classifying further comprises providing one or more signal attributes of the difference image to the machine-learning model; and
    the machine-learning model is trained to classify the detected defects as nuisance defects or defects of interest using the context attributes and the one or more signal attributes.

10. The method of claim 5, wherein the classifying is performed offline, after optically imaging the semiconductor die.

11. The method of claim 1, wherein adjusting the defect-detection filter based at least in part on the context attributes comprises:

identifying a portion of the semiconductor die as having a likelihood of generating nuisance defects when optically inspected, based at least in part of the context attributes; and setting the defect-detection filter to have a lower sensitivity for the identified portion than for other portions of the semiconductor die that are not identified as having the likelihood of generating nuisance defects when optically inspected.

12. The method of claim 1, wherein:

finding defects on the semiconductor die in accordance with the context attributes further comprises identifying care areas on the semiconductor die, using the context attributes; and adjusting the defect-detection filter comprises using a first inspection mode for the care areas and using a second inspection mode distinct from the first inspection mode for regions of the semiconductor die outside of the care areas.

13. The method of claim 12, wherein a sensitivity of the defect-detection filter is higher in the first inspection mode than in the second inspection mode.

14. A non-transitory computer-readable storage medium storing one or more programs for execution by one or more processors of a system comprising an optical inspection tool, the one or more programs including instructions for:

calculating context attributes for optical imaging of a patterned layer of a semiconductor die, comprising calculating convolutions of a pattern of the patterned layer with respective kernels of a plurality of kernels, wherein the plurality of kernels is orthogonal; and finding defects on the semiconductor die using the optical inspection tool, in accordance with the context attributes, wherein the instructions for finding defects on the semiconductor die using the optical inspection tool, in accordance with the context attributes, comprise instructions for:

optically imaging the semiconductor die to generate a target image;

comparing the target image of the semiconductor die to a reference image of the semiconductor die, to generate a difference image of the semiconductor die;

adjusting a defect-detection filter for different portions of the semiconductor die based at least in part on the context attributes;

detecting defects in the difference image using the defect-detection filter; and storing a list of the detected defects.

15. The non-transitory computer-readable storage medium of claim 14, wherein the instructions for finding defects on the semiconductor die using the optical inspection tool, in accordance with the context attributes, further comprise instructions for:

classifying the detected defects using the context attributes.

16. The non-transitory computer-readable storage medium of claim 15, wherein the instructions for classifying the detected defects comprise instructions for classifying the detected defects as nuisance defects or defects of interest using the context attributes.

17. The non-transitory computer-readable storage medium of claim 16, wherein the instructions for classifying the detected defects comprise instructions for providing the context attributes to a machine-learning model trained to classify the detected defects as nuisance defects or defects of interest using the context attributes.

18. The non-transitory computer-readable storage medium of claim 14, wherein:

the instructions for finding defects on the semiconductor die using the optical inspection tool, in accordance with the context attributes, further comprise instructions for identifying care areas on the semiconductor die, using the context attributes; and the instructions for adjusting the defect-detection filter comprise instructions for using a first inspection mode for the care areas and for using a second inspection mode distinct from the first inspection mode for regions of the semiconductor die outside of the care areas.

19. The non-transitory computer-readable storage medium of claim 18, wherein a sensitivity of the defect-detection filter is higher in the first inspection mode than in the second inspection mode.

20. A system, comprising:

an optical inspection tool;

one or more processors; and memory storing one or more programs for execution by the one or more processors, the one or more programs comprising instructions for:

calculating context attributes for optical imaging of a patterned layer of a semiconductor die, comprising calculating convolutions of a pattern of the patterned layer with respective kernels of a plurality of kernels, wherein the plurality of kernels is orthogonal; and finding defects on the semiconductor die using the optical inspection tool, in accordance with the context attributes wherein the instructions for finding defects on the semiconductor die using the optical inspection tool, in accordance with the context attributes, comprise instructions for:

optically imaging the semiconductor die to generate a target image;

comparing the target image of the semiconductor die to a reference image of the semiconductor die, to generate a difference image of the semiconductor die;

adjusting a defect-detection filter for different portions of the semiconductor die based at least in part on the context attributes;

detecting defects in the difference image using the defect-detection filter; and storing a list of the detected defects.

21. The system of claim 20, wherein the instructions for finding defects on the semiconductor die using the optical inspection tool, in accordance with the context attributes, further comprise instructions for:

classifying the detected defects using the context attributes.

22. The system of claim 21, wherein the instructions for classifying the detected defects comprise instructions for classifying the detected defects as nuisance defects or defects of interest using the context attributes.

23. The system of claim 22, wherein the instructions for classifying the detected defects comprise instructions for providing the context attributes to a machine-learning model trained to classify the detected defects as nuisance defects or defects of interest using the context attributes.

24. The system of claim 20, wherein:

the instructions for finding defects on the semiconductor die using the optical inspection tool, in accordance with the context attributes, further comprise instructions for identifying care areas on the semiconductor die, using the context attributes; and the instructions for adjusting the defect-detection filter comprise instructions for using a first inspection mode for the care areas and for using a second inspection mode distinct from the first inspection mode for regions of the semiconductor die outside of the care areas.

25. The system of claim 24, wherein a sensitivity of the defect-detection filter is higher in the first inspection mode than in the second inspection mode.

26. A method, comprising:

calculating context attributes for optical imaging of a first patterned layer of a semiconductor die, comprising:
 calculating convolutions of a first pattern of the first patterned layer with respective kernels of a first plurality of kernels, wherein the first plurality of kernels is orthogonal, and
 calculating cross-terms between the convolutions of the first pattern with the respective kernels of the first plurality of kernels and convolutions of a second pattern of a second patterned layer of the semiconductor die with respective kernels of a second plurality of kernels, wherein the second plurality of kernels is orthogonal; and finding defects on the semiconductor die in accordance with the context attributes.

* * * * *